United States Patent
Swanson

(10) Patent No.: US 6,910,355 B2
(45) Date of Patent: Jun. 28, 2005

(54) FASTENER LOCKOUT DEVICE

(76) Inventor: Richard C. Swanson, 5 Colony Dr., Orchard Park, NY (US) 14127

( * ) Notice: Subject to any disclaimer, the term of this patent is extended or adjusted under 35 U.S.C. 154(b) by 0 days.

(21) Appl. No.: 10/358,040

(22) Filed: Feb. 4, 2003

(65) Prior Publication Data

US 2004/0148985 A1 Aug. 5, 2004

(51) Int. Cl.[7] ................................................ F16B 41/00
(52) U.S. Cl. ..................................... 70/232; 411/374
(58) Field of Search ................... 70/229–232; 411/374, 411/373, 372.6, 372.5, 237, 405, 910

(56) References Cited

U.S. PATENT DOCUMENTS

| | | | | |
|---|---|---|---|---|
| 1,349,491 A | * | 8/1920 | Burton | 411/136 |
| 2,316,695 A | * | 4/1943 | Jaffa | 411/337 |
| 3,548,704 A | * | 12/1970 | Kutryk | 411/373 |
| 3,821,975 A | * | 7/1974 | Haker | 81/461 |
| 4,302,137 A | * | 11/1981 | Hart | 411/432 |
| 4,742,702 A | | 5/1988 | Swertz | |
| 4,875,819 A | * | 10/1989 | Wilkinson | 411/432 |
| 4,897,008 A | | 1/1990 | Parks | |
| 5,205,616 A | * | 4/1993 | Wright | 301/37.374 |
| 5,364,213 A | * | 11/1994 | Teramura | 411/431 |
| 5,590,992 A | * | 1/1997 | Russell | 411/431 |
| 6,053,681 A | * | 4/2000 | Mattershead | 411/195 |
| 6,116,700 A | * | 9/2000 | Herrera | 301/111.02 |

* cited by examiner

*Primary Examiner*—John B. Walsh
(74) *Attorney, Agent, or Firm*—Hodgson Russ LLP

(57) ABSTRACT

A lockout device for restricting access to a nut through which a stud passes in threaded engagement with the nut comprises a cylindrical cap and a corresponding adapter. The cap includes first and second opposite ends and has a hollow portion opening through the first end of sufficient size for receiving most or all of the nut. A threaded hole sized for threaded engagement with the stud extends in an axial direction through the second end of the cap to communicate with the cap's hollow portion. The adapter includes a leading end and a trailing end, and has a hexagonal configuration adjacent its trailing end and an axially extending stud hole through its leading end sized to accommodate the stud. The second end of the cap and the leading end of the adapter are configured for end-to-end coupling with one another, such as by providing pin holes and corresponding pins, to enable torque to be transmitted from the adapter to the cap while the cap is in threaded engagement with the stud. The invention has utility for preventing theft of heavy duty truck and vehicle wheels.

6 Claims, 1 Drawing Sheet

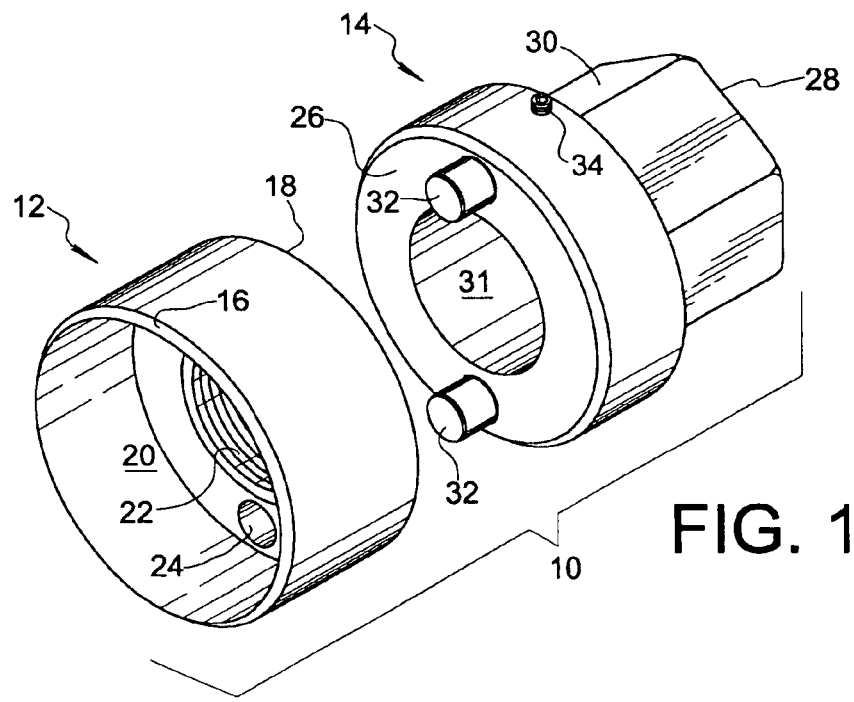
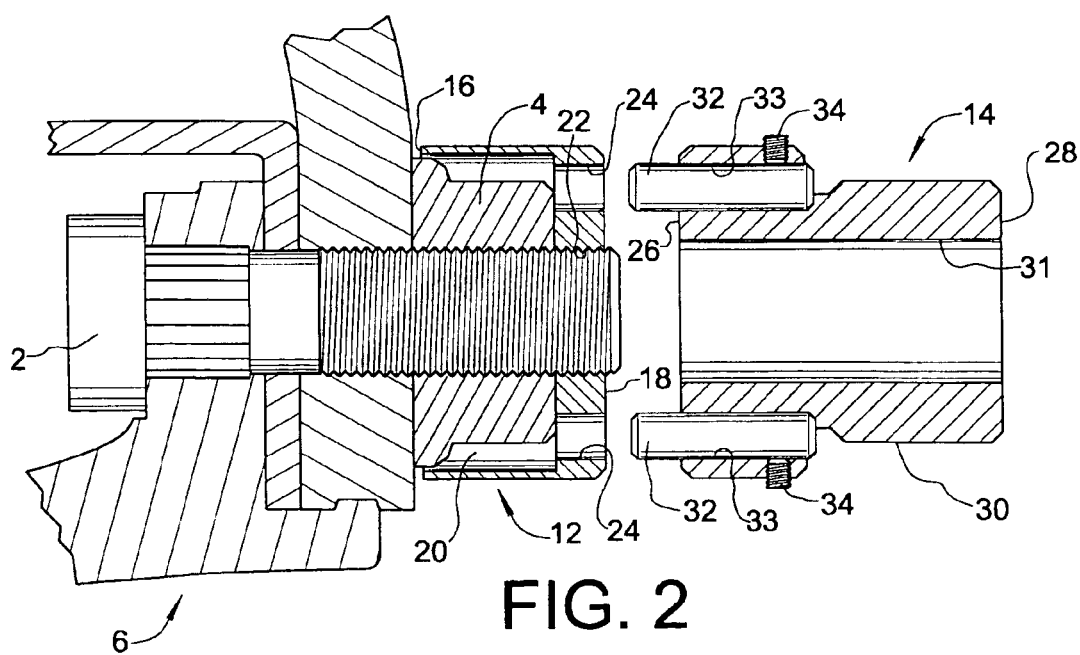

FASTENER LOCKOUT DEVICE

FIELD OF THE INVENTION

The present invention relates generally to fastener security devices, and more particularly to a fastener lockout device useful for example in deterring vehicle wheel and wheel rim theft.

BACKGROUND OF THE INVENTION

Lug nuts used to secure wheels and wheel rims on heavy trucks, buses, trailers, recreational vehicles, or the like are threadably mated with corresponding studs extending through the wheel hub to provide a clamping force. As the popularity of expensive tires and expensive alloy rims has increased, the incidence of theft of these items has also increased.

Heretofore, anti-theft nuts have been proposed for use, whereby the user removes an existing conventional nut and replaces the conventional nut with a specially designed ant-theft nut that requires a special key or adapter for application of torque to the anti-theft nut. See, for example, U.S. Pat. Nos. 4,742,702 and 4,897,008. Newer truck wheel systems require a large clamping force and different types of nuts depending on the wheel system, and studs are made longer to accommodate different wheel types. It would be desirable to have a device for deterring or preventing theft that does not require removal of an existing lug nut.

SUMMARY OF THE INVENTION

The present invention provides a fastener lockout device for restricting access to a nut through which a stud passes in threaded engagement with the nut. An embodiment of the fastener lockout device comprises generally comprises a cylindrical cap and a corresponding adapter. The cap includes first and second opposite ends and has a hollow portion opening through the first end of sufficient size for receiving most or all of the nut. A threaded hole sized for threaded engagement with the stud extends in an axial direction through the second end of the cap to communicate with the cap's hollow portion. The adapter includes a leading end and a trailing end, and has a hexagonal configuration adjacent its trailing end and an axially extending stud hole through its leading end sized to accommodate the stud. The second end of the cap and the leading end of the adapter are configured for end-to-end coupling with one another, such as by providing pin holes and corresponding pins, to enable torque to be transmitted from the adapter to the cap while the cap is in threaded engagement with the stud.

Accordingly, the cylindrical cap is installed by threading it onto unused length of a stud until it covers the existing nut when the nut is received in the hollow portion of the cap. The adapter is used by authorized persons to receive torque from a powered torque wrench and transmit the torque to the cap for tightening and loosening the cap as necessary.

BRIEF DESCRIPTION OF THE DRAWINGS

The nature and mode of operation of the present invention will now be more fully described in the following detailed description of the invention taken with the accompanying drawing figures, in which:

FIG. 1 is a perspective view of a fastener lockout device formed in accordance with an embodiment of the present invention; and FIG. 2 is a cross-sectional view showing operation of the fastener lockout device shown in FIG. 1.

DETAILED DESCRIPTION OF THE INVENTION

Referring initially to FIG. 1 of the drawings, a fastener lockout device in accordance with an embodiment of the present invention is shown and identified broadly by the reference numeral 10. Lockout device 10 generally comprises a cap 12 and a corresponding adapter 14 for use with cap 12.

Cap 12 is preferably in the form of a smooth cylindrical body and includes a first end 16 and a second end 18 opposite the first end. First end 16 opens into a hollow portion 20 for receiving a lug nut, and a threaded hole 22 extends in an axial direction from hollow portion 20 through the second end 18 of cap 12. The second end 18 of cap 12 is configured for end-to-end coupling with adapter 14, with the particular configuration being open to a wide variety of alternatives for enabling torque to be transmitted from the adapter to the cap. In the depicted embodiment, a pair of pin holes 24 (only one being visible in FIG. 1) are provided through second end 18 to hollow portion 20 for receiving corresponding pins 32 of adapter 14. However, it will be realized that many other configurations can be used, including spline configurations, milled slots, recesses, keyways, and the like.

Adapter 14 includes a leading end 26 for configured for end-to-end coupling with second end 18 of cap 12, and a trailing end 28 opposite leading end 26. Adapter 14 has an outer hexagonal portion 30 adjacent trailing end 28 for enabling the adapter to be operated by a torque wrench, for example a pneumatically powered toque wrench commonly found in service stations. As alluded to above, leading end 26 of adapter 14 is configured for end-to-end coupling with second end 18 of cap 12. In the embodiment shown, two pins 32 protrude from leading end 26 and are located for respective receipt in pin holes 24 to provide a torque transmitting connection between adapter 14 and cap 12. In the embodiment described herein, pins 32 are set in pin seating holes 33 drilled through leading end 26, and are secured by radially adjustable set screws 34, thereby allowing economical manufacturing and servicing because "off-the-shelf" hardened dowel pins can be used and replaced as necessary. An axially extending stud hole 31 is provided through leading end 26 and is sized to accommodate a stud as will be described below.

Referring to FIG. 2, use of lockout device 10 will now be described in connection with a single wheel assembly 6 of a hub piloted type, wherein reference numeral 2 identifies a stud and reference numeral 4 identifies a corresponding lug nut. As can be seen in FIG. 2, the threaded shaft of stud 2 extends through and beyond lug nut 4 when the lug nut is in a tightened condition. Cap 12 is installed over lug nut 4 such that the hollow portion of cap 12 receives the lug nut or at least a substantial portion thereof, such that access to the hexagonal configuration of the lug nut for the purpose of applying torque to the lug nut is blocked by cap 12. Cap 12 is threaded onto the exposed end of stud 4, which mates with threaded hole 22 as shown. To tighten cap 12, adapter 14 is coupled with the cap—for example by inserting pins 32 into pin holes 24—and rotated using a torque wrench arranged to engage hexagonal portion 30 of the adapter. To the extent necessary, stud 4 is accommodated by stud hole 31 in adapter 14. As will be readily understood, applied torque is transmitted by adapter 14 to cap 12. The cap is loosened for removal by applying a reverse torque in a similar manner.

Cap 12 and adapter 14 are preferably machined from a steel alloy exhibiting good hardness and rigidity.

It will be appreciated that adapter 14 serves as a "key" for removal of cap 12, which otherwise is ill-suited for the application of torque by conventional tools because of its cylindrical exterior. Thus, lockout device 10 of the present invention is intended to be manufactured with a wide variety of different cap-adapter coupling configurations. The device of the present invention can also be manufactured in a variety of sizes and proportions to fit different wheel configurations, including stud-piloted and hub-piloted disc wheels, unimount wheels, and spoke wheels. The lockout device of the present invention is particularly advantageous because it obviates the need to remove an existing standard hexagonal lug nut, an operation that requires time and introduces a safety risk.

What is claimed is:

1. A fastener lockout device for restricting access to a nut through which a stud passes in threaded engagement with said nut, said lockout device comprising:

a cap including first and second opposite ends, said cap having a hollow portion opening through said first end and sized for receiving at least a substantial portion of said nut and a threaded hole extending in an axial direction through said second end of said cap to communicate with said hollow portion, said threaded hole being sized for threaded engagement with said stud;

wherein said second end of said cap is configured for coupling with a corresponding adapter through which torque can be transmitted to said cap while said cap is in threaded engagement with said stud, said cap including at least two pin holes through said second end for receiving pins of a corresponding adapter.

2. A fastener lockout device for restricting access to a nut through which a stud passes in threaded engagement with said nut, said lockout device comprising, in combination:

a cap including first and second opposite ends, said cap having a hollow portion opening through said first end and sized for receiving at least a substantial portion of said nut and a threaded hole extending in an axial direction through said second end of said cap to communicate with said hollow portion, said threaded hole being sized for threaded engagement with said stud; and an adapter including a leading end and a trailing end, said adapter having a hexagonal configuration adjacent said trailing end and an axially extending stud hole through said leading end sized to accommodate said stud;

wherein said second end of said cap and said leading end of said adapter are configured for end-to-end coupling with one another to enable torque to be transmitted from said adapter to said cap while said cap is in threaded engagement with said stud.

3. The lockout device according to claim 2, wherein said cap has a cylindrical external surface.

4. The lockout device according to claim 2, wherein said cap includes at least two pin holes through said second end, and said adapter includes at least two pins protruding from said leading end and respectively received by said at least two pin holes to achieve said end-to-end coupling.

5. The lockout device according to claim 2, wherein said stud hole extends through said trailing end of said adapter.

6. The lockout device according to claim 2, wherein each of said at least two pins is seated within a pin seating hole extending through said leading end of said adapter and is held within said pin seating hole by a set screw extending in a radial direction of said adapter to engage said pin.

* * * * *